April 1, 1941.   R. T. GILLETTE   2,236,998
RESISTANCE WELDING
Filed June 23, 1939
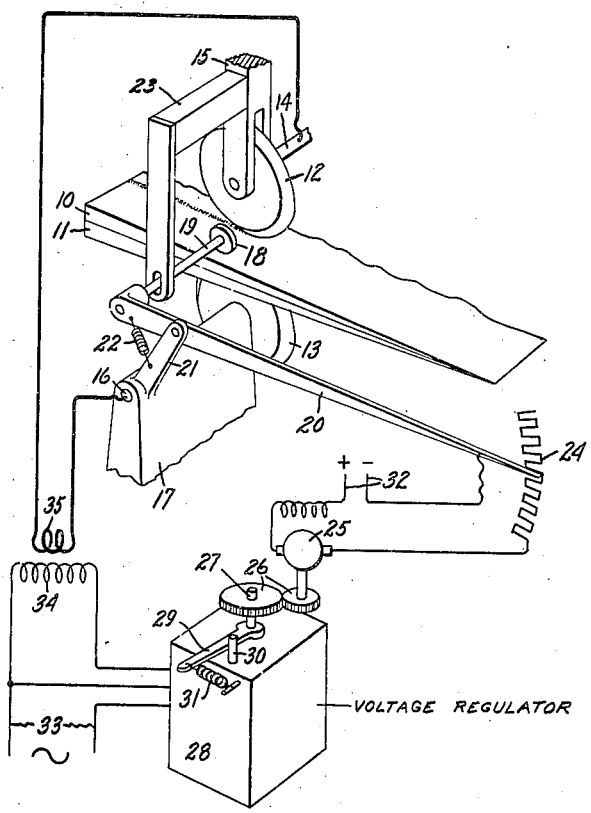
Inventor:
Robert T. Gillette,
by Harry E. Dunham
His Attorney.

Patented Apr. 1, 1941

2,236,998

UNITED STATES PATENT OFFICE 2,236,998

RESISTANCE WELDING

Robert T. Gillette, Scotia, N. Y., assignor to General Electric Company, a corporation of New York Application June 23, 1939, Serial No. 280,783

7 Claims. (Cl. 219—4)

My invention relates to resistance welding.

When welding an airplane propeller or other device formed of plates of tapered thickness where one part of the seam to be welded is of greater thickness than the other, and this thickness varies from one end of the line of welding to the other, it has been found that the amount of welding current must be continuously adjusted in accordance with the thickness of the parts at the point of welding.

It is an object of my invention to provide a method and apparatus for resistance welding parts of tapered thickness in accordance with the requirements noted above.

It is another object of my invention to provide resistance welding apparatus incorporating means for measuring the thickness of the parts subjected to the welding current, and means controlled by this measuring means for adjusting the supply of welding current in accordance with the measured thickness of these parts.

It is also an object of my invention to provide a resistance line welding machine in which means responsive to progressive changes in the thickness of the parts through which welding current is applied by the welding electrodes is used for progressively adjusting the supply of welding current to the electrodes in accordance with the variation in thickness of these parts.

Further objects of my invention will become apparent from a consideration of the apparatus diagrammatically illustrated in the drawing.

In the drawing, plates 10 and 11 of tapered thickness are resistance line welded through the agency of current and pressure applied thereto by roller electrodes 12 and 13 between which the parts to be welded pass during a welding operation. The electrode 12 is supported on a axle 14 which is journalled in a yoke 15 forming part of the welding machine. This axle may be driven by any suitable mechanism to rotate the electrode 12 and thereby cause relative movement between the work parts 10 and 11 and the electrodes 12 and 13. The electrode 13 is supported on an axle 16 journalled in a bracket 17 forming a part of the welding machine. The bracket 17 may be a stationary part of the machine in which case the yoke 15 will be operated by a suitable mechanism for moving the electrode 12 into and out of engagement with the work parts supported by the electrode 13 and for exerting the desired welding pressure on the work located between these electrodes.

The movement of the electrodes 12 and 13 relative to one another during a welding operation as a result of variations in the thickness of the work parts inserted therebetween is, in accordance with my invention, used to control the welding current supplied to these electrodes. In the particular arrangement illustrated, the thickness of the work parts is measured by the relative spacing of the electrode 13 and a roller 18 which engages the work at a point adjacent the point of engagement of the electrode 12 therewith. The roller 18 is journalled on a shaft 19 which is supported in one end of a lever 20 pivoted on an arm 21 which is mounted on the support 17 for the electrode 13. The roller 18 is biased toward the roller 13 by a spring 22 located between the arm 21 and the end of the lever 20 on which the roller 18 is supported. The roller 18 is moved into and out of engagement with the work simultaneously with the movement of the electrode 12 through the agency of a bracket 23, one end of which is attached to the yoke 15 and the other end of which is slotted for the passage therethrough of the shaft 19 on which the roller 18 is journalled. The slot is so proportioned that when the electrode 12 engages the work supported on the electrode 13, the roller 18 is free to move the lever 20 over a resistance 24 in accordance with the thickness of the work parts between the electrodes. As illustrated in the drawing, the parts just described as constituting the measuring device may be located in the throat of the welding machine where they will be protected and will in no way inconvenience the welding operator.

The free end of the lever 20 and the resistance 24 constitute a rheostat for controlling a torque motor 25, whose armature is connected through gears 26 to the shaft 27 of the rotatable member of an induction voltage regulator 28. The shaft 27 of the movable element of this regulator is provided with an arm 29 which is biased toward a stop 30 by the action of a spring 31 against the torque of motor 25. It will thus be apparent that the position of the free end of the lever 20 on the resistance 24 controls the voltage applied to the motor 25 from the source 32 and that depending upon the thickness of the work parts between the electrodes the torque of the motor 25 will vary and, consequently, adjust the movable element of the induction regulator against the bias exerted thereon through the spring 31 and lever 29.

The induction regulator is connected between the source of supply 33 and the primary 34 of the welding transformer, and varies the voltage induced in the secondary winding 35 of the welding transformer, and, consequently, varies the current supplied by this secondary winding to the electrodes 12 and 13 of the welding machine. As indicated in the drawing, the terminals of this secondary winding of the welding transformer are connected to the shafts on which the electrodes 12 and 13 are supported. It is, of course, apparent that any suitable connection by which current is supplied to the welding electrodes may be employed.

In view of the above description, it is obvious that as the thickness of the work parts varies at the point of welding, the welding current is automatically adjusted and that when resistance line welding work parts whose thickness gradually increases or decreases along a line of welding, the welding current is progressively adjusted to the value required by the thickness of the parts at the point of welding.

It is, of course, apparent that the apparatus above described may be variously modified without departing from my invention. Instead of the particular measuring means above illustrated and described, other measuring means may be employed and these measuring means may be refined so as to compensate automatically for the change in size of the welding electrodes due to wear or reconditioning. It is also apparent that my invention is not limited to resistance line welding machines since it is equally applicable to resistance spot welding machines. In either case the welding current may be further controlled by periodic interruption or the like in accordance with any desired method of welding. Means other than those illustrated may also be employed for traversing the work and electrode or electrodes relatively to one another.

Other means than that illustrated for controlling the welding current may be employed. For example, the welding current may be controlled through the agency of electric valves in the manner disclosed in United States Letters Patent 1,933,413—David C. Prince, granted November 14, 1933, in which case the resistor 24 would form part of the static phase shifter referred to on page 2, lines 119 to 126 of this patent. It is also possible to substitute a rotary phase shifter for the static phase shifter above referred to. For example, if the power circuit shown in United States Letters Patent 1,874,777—Harold T. Maser, granted August 30, 1932, is employed for controlling the flow of welding current to the electrodes 12, 13, the rotary phase shifter 29 of the control circuit shown therein may have its movable element 28 controlled in the same manner as the rotary element of the induction regulator is controlled in the system above described.

It is to be noted that in the machine illustrated and described above, the work parts do not extend to any great distance into the throat of the welding machine. In those cases where the amount of material in the throat of the welding machine varies sufficiently to change the impedance of the welding circuit materially, it will be necessary to consider this factor in the design of any regulator intended to accomplish the purposes of my invention. Suitable variations in the circuit above described will readily occur to those confronted with this problem which may, however, be avoided by welding in the manner illustrated in the drawing where only a small portion of the article being welded is inserted in the throat of the welding machine.

Arrangements and variations other than those above considered will occur to those skilled in the art in view of the description of my invention above given, and such variations and modifications are contemplated as fall within the true spirit and scope of my invention, as pointed out in the appended claims.

What I claim as new and desire to secure by Letters Patent of the United States, is:

1. A resistance welding machine comprising means including an electrode for applying welding current to the parts to be welded, means for measuring the thickness of said parts subjected to said welding current, and means controlled by said measuring means for adjusting the supply of welding current to said electrode in accordance with the measured thickness of said plates.

2. A resistance welding machine comprising means including an electrode for applying welding current to the parts to be welded, means for supplying welding current to said electrode, and means responsive to the thickness of said parts through which welding current is applied by said electrode for adjusting the welding current in accordance with the thickness of said parts.

3. A resistance welding machine comprising a pair of cooperating electrodes arranged to apply welding current and pressure to a plurality of plates which are inserted therebetween during a welding operation, means engaging said plates for measuring their thickness at said electrodes, and means controlled by said measuring means for controlling the supply of welding current to said electrodes in accordance with said measured thickness.

4. A resistance welding machine comprising cooperating electrodes arranged to exert welding pressure upon and conduct welding current through work parts inserted therebetween, means for supplying welding current to said electrodes, and means controlled by the thickness of the work parts between said electrodes for adjusting the supply of welding current to said electrodes in accordance with the thickness of said parts.

5. A resistance line welding machine comprising means including an electrode for applying welding current to the parts to be welded, means for traversing said electrode and the parts to be welded relatively to one another along a line of welding, means for supplying welding current to said electrode, and means responsive to progressive changes in the thickness of said parts through which welding current is applied by said electrode for progressively adjusting the supply of welding current to said electrodes in accordance with the variations in thickness of said parts.

6. A resistance line welding machine comprising cooperating electrodes arranged to apply welding current and pressure to a plurality of plates inserted therebetween, means for moving said plates and at least one of said electrodes relative to one another along a line of welding, means for supplying welding current to said electrodes, and means engaging said plates and controlled by progressive changes in their thickness for progressively adjusting the welding current supplied to said electrodes in accordance with the thickness of said plates when they pass between said electrodes.

7. A resistance welding machine comprising cooperating electrodes arranged to apply welding current and pressure to parts to be welded located therebetween, means for measuring the thickness of the parts included between said electrodes, means for supplying welding current to said electrodes, means including a regualtor for controlling the value of welding current supplied to said electrodes, and means operated by said measuring means for controlling said regulator and thereby the value of welding current supplied to said electrodes.

ROBERT T. GILLETTE.

CERTIFICATE OF CORRECTION.

Patent No. 2,236,998. April 1, 1941.

ROBERT T. GILLETTE.

It is hereby certified that error appears in the printed specification of the above numbered patent requiring correction as follows: Page 2, first column, line 33, for the patent number "1,933,413" read --1,935,413--; and that the said Letters Patent should be read with this correction therein that the same may conform to the record of the case in the Patent Office.

Signed and sealed this 6th day of May, A. D. 1941.

(Seal)

Henry Van Arsdale,
Acting Commissioner of Patents.